United States Patent [19]

Tamm

[11] Patent Number: 5,236,177
[45] Date of Patent: Aug. 17, 1993

[54] ELECTRICAL JUNCTION BOX WIRE PULLING GUIDE

[75] Inventor: Carl R. Tamm, Jonesborough, Tenn.

[73] Assignee: Buchanan Construction Products, Inc., Hackettstown, N.J.

[21] Appl. No.: 850,425

[22] Filed: Mar. 12, 1992

[51] Int. Cl.[5] .............................................. B65H 59/00
[52] U.S. Cl. ........................................... 254/134.3 FT
[58] Field of Search ............... 254/134.3 R, 134.3 FT, 254/134.3 PA, 389; 242/157; 226/193

[56] References Cited

U.S. PATENT DOCUMENTS

| | | | |
|---|---|---|---|
| 1,108,748 | 8/1914 | Hampton | 254/134.3 R |
| 2,515,724 | 7/1950 | McCroskey | 254/134.3 R |
| 2,727,721 | 12/1955 | Pinkerton . | |
| 2,746,715 | 5/1956 | Sherrod . | |
| 2,746,716 | 5/1956 | Zachary . | |
| 3,037,744 | 6/1962 | Cooper | 254/134.3 FT |
| 3,038,702 | 6/1962 | Trunnell | 254/134.3 FT |
| 3,052,451 | 9/1962 | Hamrick | 254/134.4 |
| 3,306,581 | 2/1967 | Miller | 254/134.3 FT |
| 4,029,249 | 6/1977 | Nagel et al. | 226/193 |
| 4,541,615 | 9/1985 | King, Jr. . | |
| 4,796,865 | 1/1989 | Marchetti | 254/134.3 R |
| 4,909,481 | 3/1990 | Tamm . | |
| 4,946,137 | 8/1990 | Adamszak . | |
| 4,951,923 | 8/1990 | Couture . | |

FOREIGN PATENT DOCUMENTS

| | | | |
|---|---|---|---|
| WO81/03321 | 11/1981 | PCT Int'l Appl. | 226/193 |
| 619991 | 8/1978 | U.S.S.R. | 254/134.3 FT |
| 1178593 | 1/1970 | United Kingdom | 254/134.3 FT |

OTHER PUBLICATIONS

All American Tool Co. brochure, "Pull Buddy".
"Cable Guides" 1990.

Primary Examiner—Robert C. Watson
Attorney, Agent, or Firm—Kinzer, Plyer, Dorn, McEachran & Jambor

[57] ABSTRACT

A guide for placement in an opening in an electrical junction box and which will extend into a conduit mounted at the box opening includes a generally tubular body having an axially extending opening. The body is resilient so that external pressure applied thereto will reduce the width of the opening to permit the body and thus the guide to be positioned within the conduit. When pressure is released, the body will expand into an interference fit with an appropriately sized conduit. There is a roller mounted to one end of the tubular body for movement about an axis generally perpendicular to that of the body. Wires or other flexible members may be passed over the roller in moving from a conduit into a box and from the box into a conduit.

4 Claims, 1 Drawing Sheet

ELECTRICAL JUNCTION BOX WIRE PULLING GUIDE

THE FIELD OF THE INVENTION

There are numerous devices currently available on the market which are useful to guide a wire conductor into an electrical junction box from the access opening to which a conduit may be attached. The present invention provides the same function, but also permits a conductor to be guided from one conduit through a junction box and into a second conduit mounted to the same box while avoiding abrasion of the insulation on the conductor. The guide has a resilient or flexible tubular body which is sized to fit a conduit of a particular nominal dimension. The body has an axial opening and when the sides of the body are squeezed together, reducing the width of the opening, the body may be inserted into the conduit. Upon release, the body will expand to an interference fit within the conduit. There is a roller attached at one end of the body which provides an antifriction means of pulling the wire from the conduit and through or into the junction box. There is a stop which also functions as a mounting for the roller to limit the insertion of the tubular body into the conduit.

SUMMARY OF THE INVENTION

The present invention relates to a guide for use in passing flexible members such as electrical conductors to and from a conduit into an electrical junction box. A primary purpose of the invention is a guide of the type described which permits insulated wires to be guided from one conduit, through an electrical junction box and into another conduit without abrading or damaging the wire insulation.

Another purpose is a simply constructed and reliable wire pulling guide which may be used in electrical junction boxes and which is sized for conduits of certain dimensions.

Another purpose is a guide of the type described which may be universally used in all electrical junction boxes.

Another purpose is a wire pulling guide of the type described which may be mounted in any conceivable position in a junction box.

Another purpose is a wire pulling guide which may be utilized in boxes which are mounted in finished buildings and which do not require access to the sides or edges of the box for mounting.

Another purpose is a guide as described which may be used with the typical electrical junction box having a plurality of knockout apertures, with the guide being usable in any of the apertures and in any disposition within the junction box.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
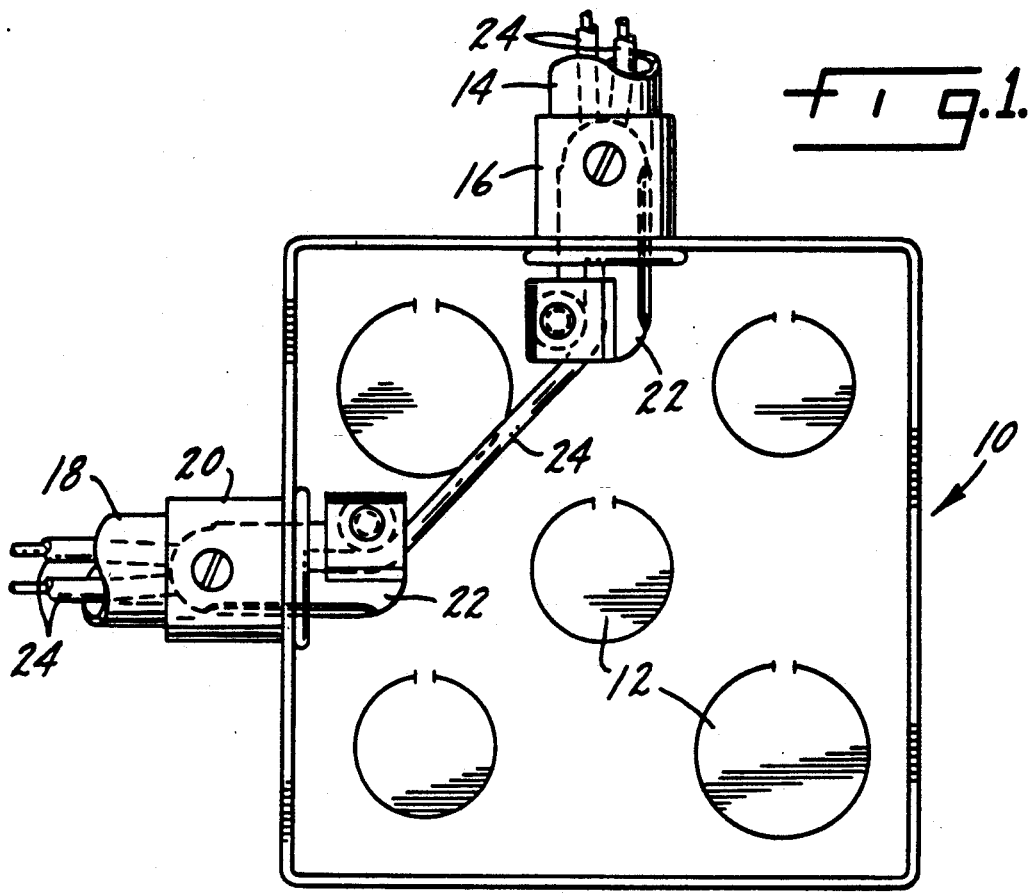
FIG. 1 is a plan view of an electrical junction box showing two wire pulling guides of the present invention mounted therein.
Figure 2:
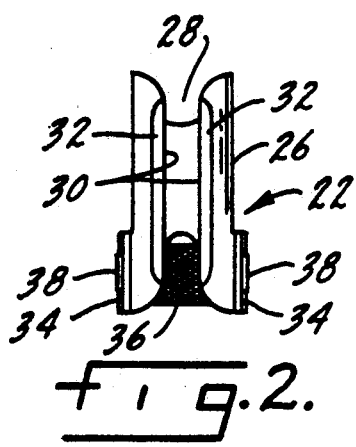
FIG. 2 is a top plan view of the wire pulling guide.
Figure 4:
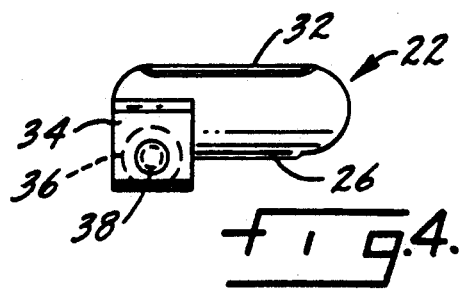
FIG. 4 is a side view of the wire pulling guide.
Figure 3:
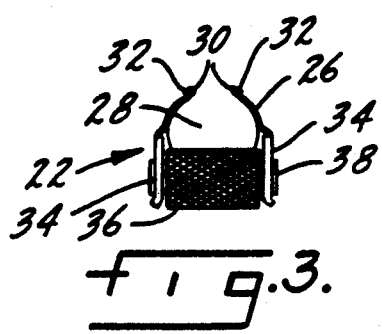
FIG. 3 is an end view of the wire pulling guide.

In the drawings, a conventional electrical junction box is indicated at 10 and may have a plurality of knockout areas 12 which are typically removed for attachment of an electrical conduit. Normally, there will be knockout openings along the four sides and the back of the junction box. As shown in FIG. 1, a conduit 14 is attached by a connector 16 to one of the top openings in the junction box 10 and a second conduit 18 is attached by a connector 20 to one of the knockout openings in a side of the junction box. Wire pulling guides of the type disclosed herein are indicated generally at 22 and are positioned within both conduits 14 and 18 so that insulated conductors, such as indicated at 24, may pass from one conduit, through the junction box, and out into the other conduit.

Obviously, the invention has utility in which it is desired to only pull wires into a junction box. However, the invention has particular usefulness when wires are to pass through a junction box. Normally, when such is to take place there is a substantial chance of the wire being abraded as it passes from one conduit to another. In the present instance, the wire can be pulled through the junction box from one conduit to another without any frictional resistance due to the unique construction of the guide disclosed herein.

The guide includes a tubular body 26 which has an axial opening 28. Preferably, the tubular body is formed of a thin gauge flexible spring material, for example Alloy 25, Beryllium-Copper having a thickness of 0.023". The invention should not be limited to this particular material for the tubular body, as what is important is that the body be resilient or flexible so that it may be squeezed to reduce its exterior size and then expand outwardly when released after insertion into a conduit so as to provide an interference fit therewith.

Figure 5:
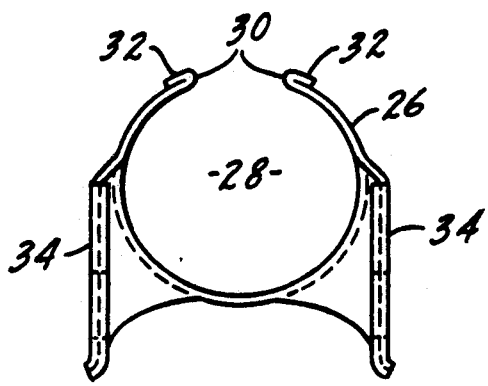
FIG. 5 is an enlarged end view of the wire pulling guide with the roller removed.

The opposed edges 30 of the tubular body may have bentover flaps indicated at 32 so as to eliminate any sharp edges which might cut the fingers of the electrician using the guide. The tubular body may have opposing walls 34 adjacent one end and these walls may be generally tangential to the body exterior, as shown particularly in FIG. 5. In the preferred form of the invention the tubular body and the walls are formed from a single stamping shaped to the configuration shown. The walls 34 journal a roller 36 having a knurled exterior surface. Rivets or the like 38 may form the means for rotatably attaching the roller to the walls 34. The roller rotates about an axis which is generally perpendicular to the axis of the tubular body, thus as shown particularly in FIG. 1, a wire 24 may be drawn in a generally frictionless manner over the roller and through the wire guide and into the junction box and then either out through another conduit and guide, or the wire may be terminated within the junction box.

In use, the tubular body may be squeezed together to narrow the opening 28. This will allow the wire guide to be inserted into a conduit having a nominal diameter generally the same as the exterior of the wire guide. When released, the wire guide will spring back into an interference fit with the conduit. The wire guide is pushed into the conduit to the point where the walls 34 will contact the edge of the conduit, the junction box or the connector for the conduit. Thus, the walls 34 not only function as the support for the roller, but function as a stop limiting insertion of the wire guide into the conduit. After use, the wire guide is easily removed with the axial opening 28 permitting the guide to be pulled away from the wires.

Because the wire guide is held in an interference fit within the conduit, the wire guide may be oriented or disposed in any position and it will remain so positioned, even when wires are pulled through it. The interference fit holds the wire guide in position, regardless of orientation and regardless of the direction in which wires are pulled through it.

The wire guide does not require access to an edge of the junction box, as it is mounted from inside the junction box. The wire guide may be used in finished construction or in new construction and can be sized to accommodate conduits of different dimension. The wire guide, because it is open along one portion, may be used with junction boxes in which conductors are already installed. It is only necessary to pull a small amount of slack in the existing conductors and then the wire guide may be inserted under them and into the conduit.

Whereas the preferred form of the invention has been shown and described herein, it should be realized that there may be many modifications, substitutions and alterations thereto.

The embodiments of the invention in which an exclusive property are claimed are defined as follows:

1. An electrical junction box opening guide which will extend into a conduit mounted at the box opening, said guide providing a means for relatively frictionless guiding of flexible members such as wires through the box and conduit and including a generally tubular body having an axial opening extending the length thereof, said body being formed of a thin spring metallic material and being resilient whereby external pressure thereon will reduce the width of the opening to provide for insertion of the body within a similarly sized conduit, with the body, upon release of pressure, moving to an interference fit within the conduit, a pair of opposed walls at one end of said body and integral therewith, a roller rotatably mounted between said walls for rotation about an axis generally perpendicular to the tubular body axis, said walls forming a stop limiting insertion of said guide into the conduit.

2. The guide of claim 1 further characterized in that said roller has an exterior gripping surface for contact with a wire.

3. The guide of claim 2 further characterized in that the exterior surface of said roller is knurled.

4. The guide of claim 1 further characterized in that said walls are generally tangential to said tubular body.

* * * * *